(12) United States Patent
Furukori et al.

(10) Patent No.: US 12,287,020 B2
(45) Date of Patent: Apr. 29, 2025

(54) ANTI-VIBRATION DEVICE

(71) Applicant: Prospira Corporation, Kawasaki (JP)

(72) Inventors: Takeshi Furukori, Kawasaki (JP);
Yuzo Hattori, Kawasaki (JP); Hiroshi Kojima, Kawasaki (JP)

(73) Assignee: Prospira Corporation, Kawasaki (JP)

( * ) Notice: Subject to any disclaimer, the term of this patent is extended or adjusted under 35 U.S.C. 154(b) by 181 days.

(21) Appl. No.: 18/248,052

(22) PCT Filed: Oct. 11, 2021

(86) PCT No.: PCT/JP2021/037557
§ 371 (c)(1),
(2) Date: Apr. 6, 2023

(87) PCT Pub. No.: WO2022/080310
PCT Pub. Date: Apr. 21, 2022

(65) Prior Publication Data
US 2023/0375069 A1 Nov. 23, 2023

(30) Foreign Application Priority Data
Oct. 12, 2020 (JP) .................................. 2020-171736

(51) Int. Cl.
*F16F 13/14* (2006.01)
*B60K 5/12* (2006.01)

(52) U.S. Cl.
CPC .... *F16F 13/14* (2013.01); *B60G 2204/41062* (2013.01); *B60K 5/1208* (2013.01)

(58) Field of Classification Search
CPC .................. F16F 13/14; F16F 13/1463; B60G 2204/41062; B60K 5/1208
See application file for complete search history.

(56) References Cited

U.S. PATENT DOCUMENTS 7,866,639 B2 * 1/2011 Endo ....................... F16F 13/14
267/219
9,279,473 B2 * 3/2016 Matsushita ......... F16F 13/1463
(Continued)

FOREIGN PATENT DOCUMENTS

JP 86427549 U 2/1989
JP H0643855 B2 6/1994
(Continued)

OTHER PUBLICATIONS

Oct. 17, 2024, search result of the Extended European Search Report issued by the European Patent Office in the corresponding European Patent Application No. 21880049.8.
(Continued)

*Primary Examiner* — Thomas W Irvin
(74) *Attorney, Agent, or Firm* — KENJA IP LAW PC

(57) ABSTRACT

An anti-vibration device (1) includes a covering member (17), arranged between an inner attachment member (11) and an outer cylinder (12), that covers, from outside in the radial direction, the area between a pair of middle elastic bodies (32) adjacent to each other in the circumferential direction, and defines a pair of liquid chambers (14a, 14b) between the inner attachment member and the covering member. An orifice passage (19) connecting each liquid chamber is formed between the covering member and the outer cylinder. A first connecting aperture (18) and a second connecting aperture (20) that separately connect each liquid chamber and the orifice passage are formed in the covering member. An injection hole (12a) formed in the outer cylinder and sealed by a sealing material (16) opens toward at least one of the first connecting aperture and the second connecting aperture.

3 Claims, 11 Drawing Sheets

(56) References Cited

U.S. PATENT DOCUMENTS

| | | | |
|---|---|---|---|
| 9,366,308 B2* | 6/2016 | Kojima | F16F 13/14 |
| 10,107,354 B2* | 10/2018 | Kojima | F16F 13/16 |
| 11,231,083 B2* | 1/2022 | Kojima | F16F 13/1481 |
| 11,255,404 B2* | 2/2022 | Kojima | F16F 13/1481 |
| 2010/0140856 A1* | 6/2010 | Endo | F16F 13/14 |
| | | | 267/140.12 |
| 2013/0062822 A1* | 3/2013 | Matsushita | F16F 13/1463 |
| | | | 267/219 |
| 2015/0184717 A1* | 7/2015 | Kojima | F16F 13/14 |
| | | | 267/140.11 |
| 2016/0025182 A1* | 1/2016 | Saito | F16F 13/105 |
| | | | 267/140.13 |
| 2017/0067529 A1* | 3/2017 | Kojima | B60K 5/1208 |
| 2017/0299011 A1* | 10/2017 | Kojima | F16F 13/14 |
| 2018/0066726 A1 | 3/2018 | Parr et al. | |
| 2020/0116226 A1* | 4/2020 | Kojima | F16F 13/1463 |
| 2020/0362938 A1* | 11/2020 | Kojima | F16F 13/1481 |

FOREIGN PATENT DOCUMENTS

| | | | |
|---|---|---|---|
| JP | H0771512 A | 3/1995 | |
| JP | H08121527 A | 5/1996 | |
| JP | 2007085376 A | 4/2007 | |
| JP | 2019086099 A | 6/2019 | |
| JP | 2019086104 A | 6/2019 | |

OTHER PUBLICATIONS

Dec. 7, 2021, International Search Report issued in the International Patent Application No. PCT/JP2021/037557.

Apr. 13, 2023, International Preliminary Report on Patentability issued in the International Patent Application No. PCT/JP2021/037557.

* cited by examiner

ANTI-VIBRATION DEVICE

TECHNICAL FIELD

The present disclosure relates to an anti-vibration device.

The present application claims priority to Japanese Patent Application No. 2020-171736 filed on Oct. 12, 2020, the entire contents of which are incorporated herein by reference.

BACKGROUND

An anti-vibration device includes an inner attachment member to be connected to one of a vibration generating portion and a vibration receiving portion, an outer cylinder to be connected to the other of the vibration generating portion and the vibration receiving portion and surrounding the inner attachment member, and an elastic body elastically connecting the inner attachment member and the outer cylinder.

In a known configuration of this type of anti-vibration device, for example as illustrated in Patent Literature (PTL) 1 below, the elastic body includes a pair of middle elastic bodies arranged separately on both sides of the inner attachment member in the radial direction, a covering member is arranged between the inner attachment member and the outer cylinder, covers, from outside in the radial direction, the area between the pair of middle elastic bodies adjacent to each other in the circumferential direction, and defines a pair of liquid chambers between the inner attachment member and the covering member, and an orifice passage connecting each liquid chamber in the pair of liquid chambers is formed between the covering member and the outer cylinder.

One known method of sealing a liquid in a liquid chamber is to inject the liquid into the liquid chamber through an injection hole formed in the outer cylinder while the liquid chamber is at a lower pressure than atmospheric pressure, and then fit a sealing material, such as a rivet, into the injection hole.

CITATION LIST

Patent Literature

PTL 1: JP 2019-86099 A

SUMMARY

Technical Problem

In the conventional anti-vibration device described above, the sealing material protrudes radially inward from the inner circumferential surface of the outer cylinder, and the aperture circumferential edge of the injection hole in the outer cylinder may be plastically deformed radially inward and abut against a member, such as the covering member, provided on the inside of the outer cylinder.

The present disclosure has been conceived in light of such circumstances and aims to provide an anti-vibration device that can prevent the sealing material from abutting against a member provided on the inside of the outer cylinder.

Solution to Problem

An anti-vibration device according to a first aspect of the present disclosure includes:

an inner attachment member to be connected to one of a vibration generating portion and a vibration receiving portion and an outer cylinder to be connected to the other of the vibration generating portion and the vibration receiving portion and surrounding the inner attachment member; and an elastic body elastically connecting the inner attachment member and the outer cylinder, wherein the elastic body includes a pair of middle elastic bodies arranged separately on both sides of the inner attachment member in a radial direction intersecting a central axis of the outer cylinder in plan view from an axial direction along the central axis, a covering member is arranged between the inner attachment member and the outer cylinder, covers, from outside in the radial direction, an area between the pair of middle elastic bodies adjacent to each other in a circumferential direction about the central axis in the plan view, and defines a pair of liquid chambers between the inner attachment member and the covering member, an orifice passage connecting each liquid chamber in the pair of liquid chambers is formed between the covering member and the outer cylinder, a first connecting aperture and a second connecting aperture that separately connect each liquid chamber in the pair of liquid chambers and the orifice passage are formed in the covering member, and an injection hole formed in the outer cylinder and sealed by a sealing material opens toward at least one of the first connecting aperture and the second connecting aperture.

Advantageous Effect

According to the anti-vibration device of the present disclosure, the sealing material can be prevented from abutting against a member provided on the inside of the outer cylinder.

DETAILED DESCRIPTION

An embodiment of an anti-vibration device according to the present disclosure is described below with reference to FIGS. 1 to 11.

An anti-vibration device 1 of the present embodiment includes an inner attachment member 11 to be connected to one of a vibration generating portion and a vibration receiving portion, an outer cylinder 12 to be connected to the other of the vibration generating portion and the vibration receiving portion and surrounding the inner attachment member 11, and elastic bodies 31, 32 elastically connecting the inner attachment member 11 and the outer cylinder 12.

The anti-vibration device 1 is, for example, used as a suspension bushing or an engine mount for automobiles or a mount for industrial machinery installed in factories.

The direction along the central axis O of the outer cylinder 12 is referred to as the axial direction. In a plan view from the axial direction, the direction intersecting the central axis O is referred to as the radial direction, and the direction about the central axis O is referred to as the circumferential direction. In the axial direction, the side of anti-vibration device 1 by the center is referred to as the inside, and the side away from the center of the anti-vibration device 1 is referred to as the outside.

Figure 1:
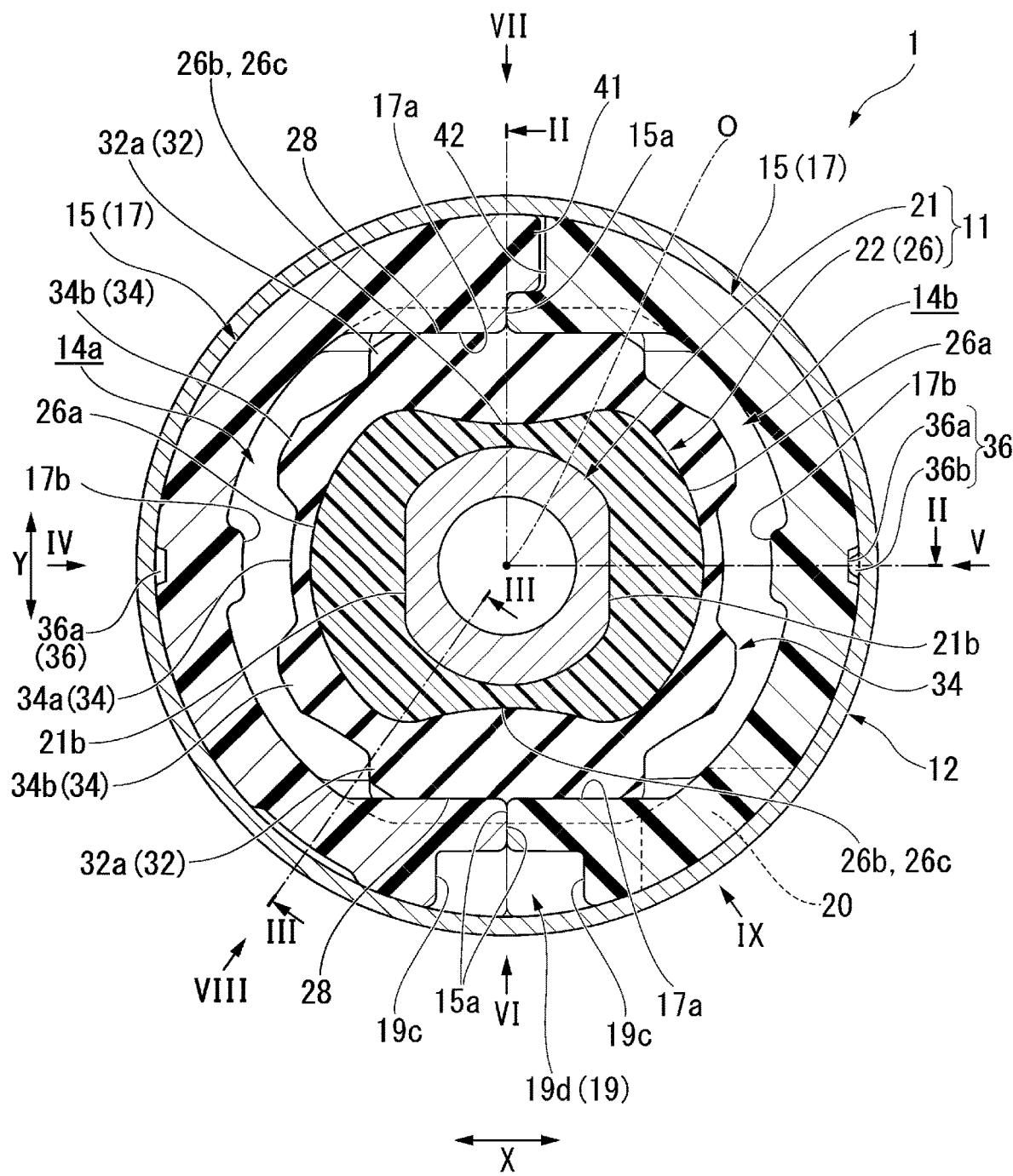
FIG. 1 is a horizontal cross-sectional view at the central portion in the axial direction of an anti-vibration device illustrated as an embodiment according to the present disclosure.
Figure 2:
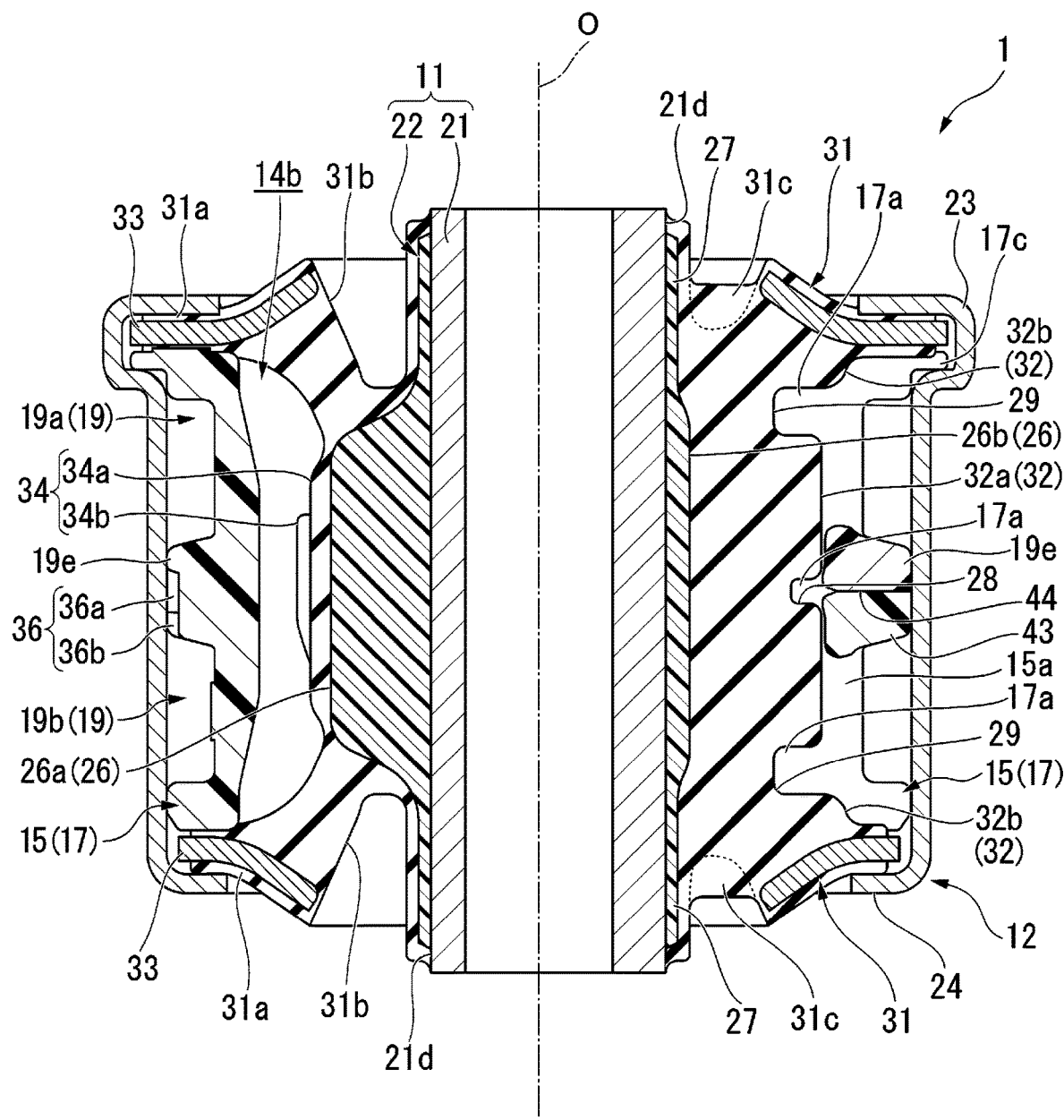
FIG. 2 is a cross-sectional view along arrows II-II of the anti-vibration device illustrated in FIG. 1.

As illustrated in FIGS. 1 and 2, the inner attachment member 11 includes a cylindrical core 21 and a resin portion 22 adhered to the outer circumferential surface of the core 21.

The core 21 is arranged coaxially with the central axis O. Both axial ends 21d in the core 21 separately protrude axially outwardly from the outer cylinder 12. The core 21 has a noncircular shape when viewed from the axial direction. Two flat first chamfered portions 21b, extending continuously along the entire length in the axial direction, are formed on the outer circumferential surface of the core 21 and are spaced apart in the circumferential direction. The core 21 has a noncircular shape, when viewed from the axial direction, along the entire length thereof in the axial direction. The first chamfered portions 21b are provided on the outer circumferential surface of the core 21 on each side of the central axis O in the radial direction.

Hereafter, the direction in which the two first chamfered portions 21b face each other in plan view from the axial direction is referred to as one direction X, and the direction orthogonal to the one direction X is referred to as the other direction Y.

The resin portion 22 is formed of a synthetic resin material, such as polyamide. The resin portion 22 is provided on a portion of the outer circumferential surface of the core 21 that is located inward in the axial direction from the axial ends 21d. The resin portion 22 is provided over the entire outer circumferential surface of the core 21 except for the axial ends 21d.

The outer circumferential surface of at least the axial ends of the resin portion 22 has a noncircular shape when viewed from the axial direction.

In the illustrated example, the outer circumferential surface of the resin portion 22 has a noncircular shape when viewed from the axial direction over the entire length thereof in the axial direction.

The resin portion 22 includes a middle portion 26 provided at the axial middle portion on the outer circumferential surface of the core 21 and a pair of outer portions 27 extending separately from the middle portion 26 outward in the axial direction.

The outer circumferential surface of the outer portions 27 is located radially inward from the outer circumferential surface of the middle portion 26, which is located axially inward from the outer portions 27.

The thickness of the outer portions 27 is equal throughout. When viewed from the axial direction, the outer circumferential surface of the outer portions 27 has the same shape as the outer circumferential surface of the axial ends 21d in the core 21.

The thickness of the middle portion 26 is greater than that of the outer portions 27 throughout. The radially outward-facing top surface of the middle portion 26 extends straight in the axial direction, in a vertical cross-section along the axial direction, across the entire circumferential length. The middle portion 26 has a rectangular shape, elongated in the one direction X, when viewed from the axial direction.

A stopper elastic portion 34, described below, is connected to short side portions 26a, which face the one direction X and extend in the other direction Y, of the outer circumferential surface of the middle portion 26. The short side portions 26a have a projecting curved shape when viewed from the axial direction. The short side portions 26a are diametrically opposite liquid chambers 14a, 14b. The short side portions 26a are radially positioned the farthest outward on the outer circumferential surface of the inner attachment member 11. The liquid chambers 14a, 14b may be expressed as a pair of liquid chambers 14a, 14b.

A middle elastic body 32, described below, is connected to the long side portions 26b of the outer circumferential surface of the middle portion 26, which face the other direction Y and extend in the one direction X. A recession 26c, recessed in the other direction Y, is formed on the long side portion 26b. In the illustrated example, the recessions 26c are formed throughout the long side portions 26b except for the ends in the one direction X and become shallower with increased distance from the center along the one direction X. The long side portions 26b have a concave curved shape when viewed from the axial direction. The recessions 26c need not be formed on the long side portions 26b.

In the middle portion 26, the thickness of the central portion in the other direction Y is greatest at short side portions 26a, and the thickness of the central portion in the one direction X is smallest at the long side portions 26b. The connecting portion between the short side portion 26a and the long side portion 26b, i.e., the connecting portion between the portion to which the below-described stopper elastic portion 34 is connected and the portion to which the below-described middle elastic body 32 is connected on the outer circumferential surface of the inner attachment member 11, bulges radially outward when viewed from the axial direction. In the illustrated example, the connecting portion between the short side portion 26a and the long side portion 26b has a curved shape projecting in the other direction Y when viewed from the axial direction. The outer diameter of the middle portion 26 may be equal over the entire circumference.

The elastic bodies 31, 32 are formed of rubber material and are bonded by vulcanization to the outer circumferential surface of the inner attachment member 11. The elastic bodies 31, 32 include an annular pair of end elastic bodies 31, which are axially spaced apart and fitted into the outer cylinder 12, and a pair of middle elastic bodies 32, which are separately arranged between the end elastic bodies 31 on each side of the inner attachment member 11 in the radial direction. The elastic bodies 31, 32 need not include the end elastic bodies 31.

Each end elastic body 31 includes an end flange 31a that surrounds the outer portion 27 from the outside in the radial direction and an end connector 31b that connects the inner end of the end flange 31a in the radial direction to the outer circumferential surface of the inner attachment member 11.

The end flange 31a extends continuously over the entire circumferential length. The end flange 31a is coaxially disposed with the central axis O. The end flange 31a is located axially inwardly from the axial end of the inner attachment member 11. An annular rigid plate 33 extending in the circumferential direction is provided on the end flange 31a. The rigid plate 33 is formed of a hard material, such as a metal material or a synthetic resin material. The rigid plate 33 is embedded within the end flange 31a.

The end connector 31b is cylindrical in shape and extends continuously over the entire circumferential length. The end connector 31b extends radially inward from the radial inner end of the end flange 31a as it moves downward or upward (axially inwardly). The end connector 31b is connected to the axial outer end in the middle portion 26. The end connector 31b is coaxially disposed with the central axis O.

A reinforcing portion 31c is formed on the inner circumferential surface of the end elastic body 31, protruding inward in the radial direction and connected to the outer surface circumferential of the outer portion 27. The end elastic body 31 is connected to the outer circumferential surface of the outer portion 27 by the reinforcing portion 31c. The reinforcing portion 31c is provided in two different circumferential positions and is separately arranged on opposite sides of the inner attachment member 11 in the radial direction. On the outer circumferential surface of the outer portion 27, the reinforcing portion 31c is connected to the portion axially adjacent to the central portion in the one direction X of the long side portion 26b of the middle portion 26.

In the inner attachment member 11, the outer circumferential surface of the outer portions 27 to which the reinforcing portion 31c is connected is located radially inward from the outer circumferential surface of the middle portion 26, which is located axially inward from the outer portions 27. This can secure a larger radial size of the reinforcing portions 31c, i.e., a larger volume of the end elastic bodies 31. The reinforcing portions 31c need not be formed in the end elastic bodies 31, and the end elastic bodies 31 may be connected to the outer circumferential surface of the outer portions 27 without being connected to the middle portion 26.

Figure 11:
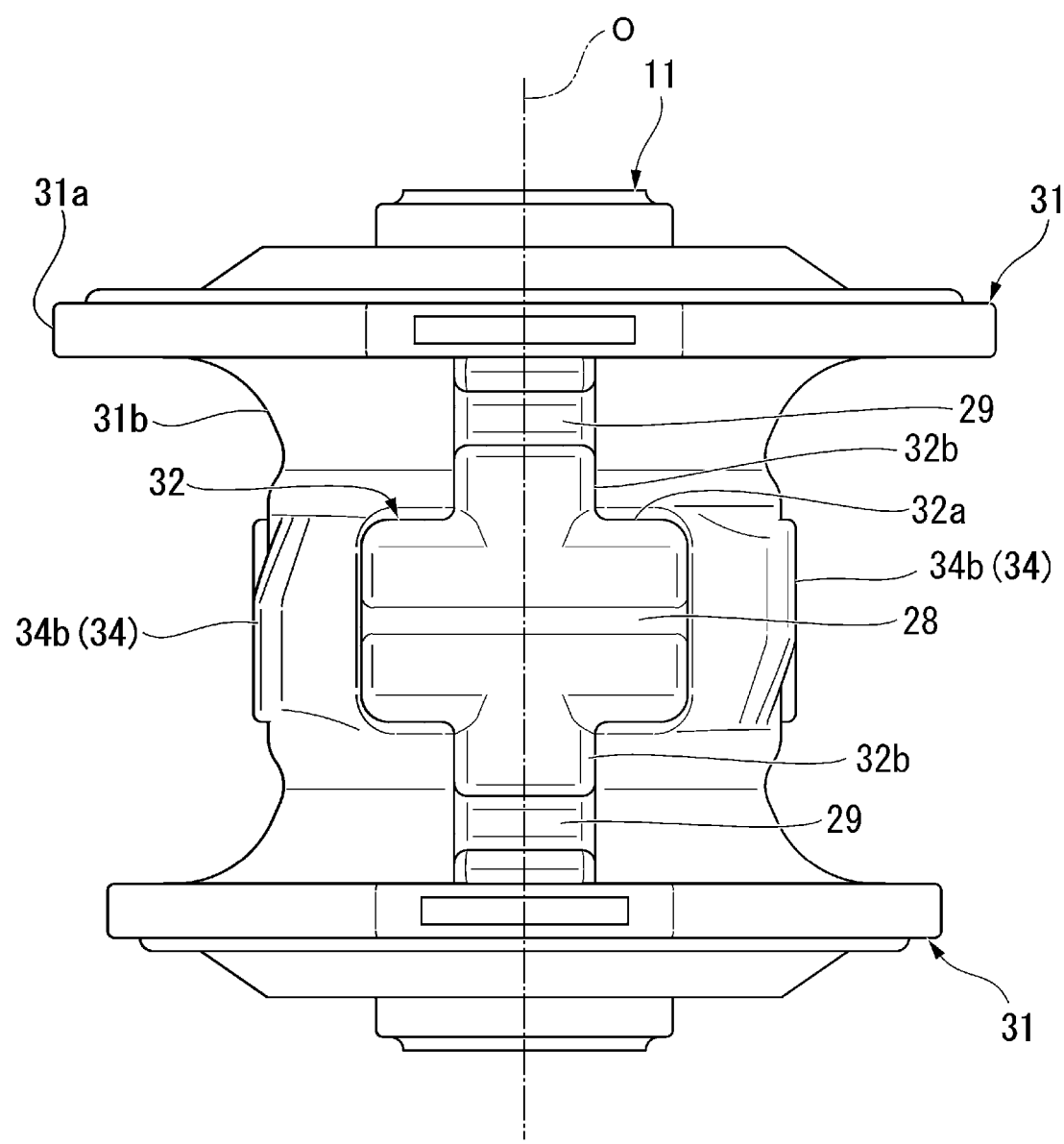
FIG. 11 is a side view, looking at a middle elastic body from the front, in the anti-vibration device illustrated in FIGS. 6 and 7 with the outer cylinder and a covering member removed.

The middle elastic bodies 32 are arranged separately on opposite sides of the inner attachment member 11 in the radial direction. The pair of middle elastic bodies 32 are of an equivalent shape and of equivalent size to each other. The middle elastic bodies 32 are formed entirely of rubber material. As illustrated in FIG. 11, each middle elastic body 32 includes a main portion 32a arranged in the axial center in the inner attachment member 11 and a pair of secondary portions 32b, each protruding from the main portion 32a axially outward and having a smaller volume than the main portion 32a. The main portion 32a and the secondary portions 32b each have a rectangular shape with one pair of sides extending in the circumferential direction and the other pair of sides extending in the axial direction in a front view from the outside in the radial direction. The circumferential size of the main portion 32a is larger than that of the secondary portions 32b. The secondary portions 32b are connected to the circumferential center of the main portion 32a. The axial outer end of each secondary portion 32b is connected to an end elastic body 31. The radially outward-facing outer surfaces of the main portion 32a and the secondary portions 32b, respectively, are flat surfaces extending in two directions, i.e., in the axial direction and in a lateral direction orthogonal to the axial direction in a front view from the outside in the radial direction. The outer surfaces of each of the main portion 32a and the secondary portions 32b are connected without a step.

Figure 10:
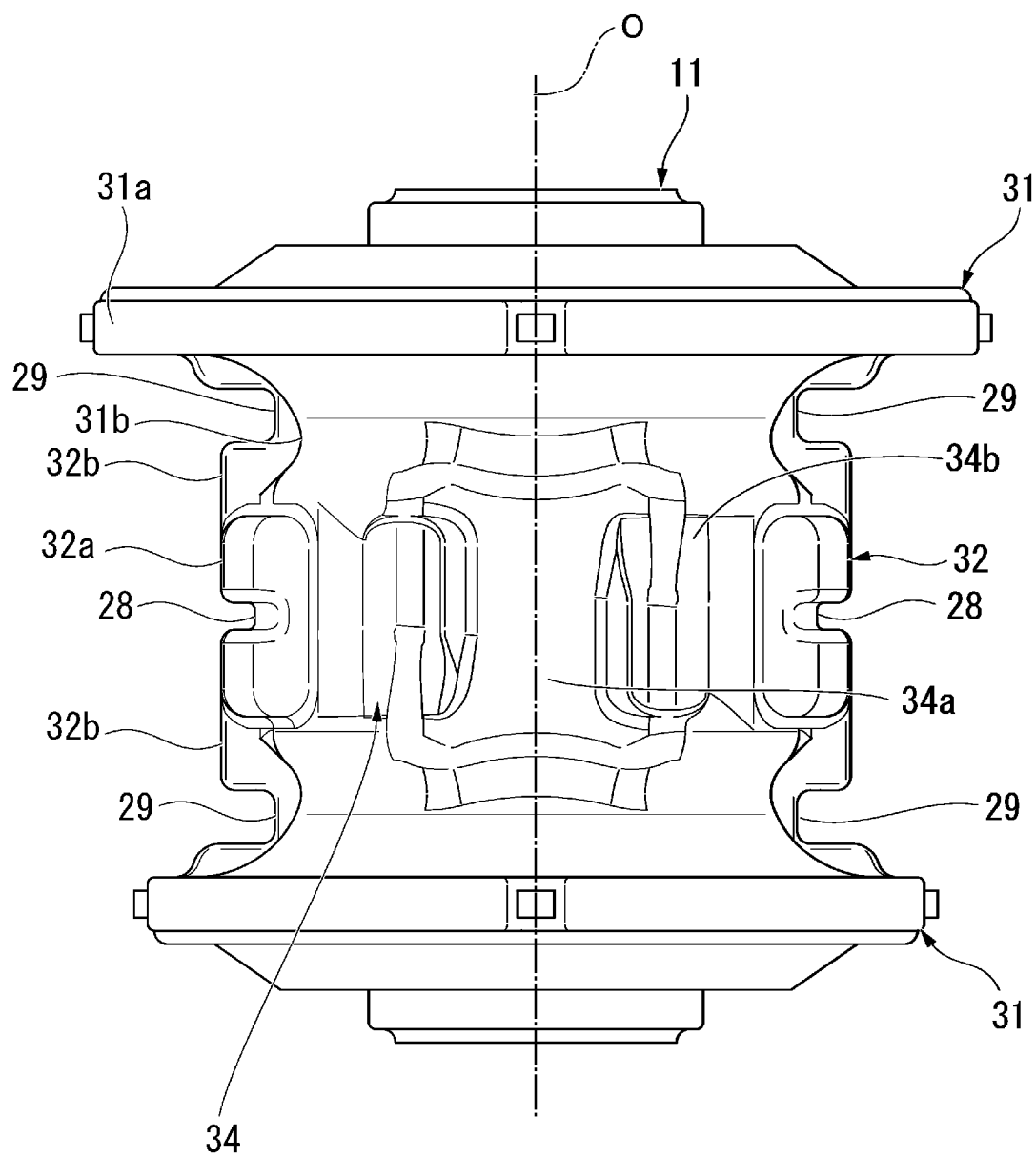
FIG. 10 is a side view, looking at a stopper elastic portion from the front, in the anti-vibration device illustrated in FIGS. 4 and 5 with the outer cylinder and a covering member removed.

As illustrated in FIGS. 1, 2, and 10, stopper elastic portions 34 protruding toward each of the liquid chambers 14a, 14b are provided separately on the outer circumferential surface of the inner attachment member 11. The stopper elastic portions 34 need not be provided on the outer circumferential surface of the inner attachment member 11. The stopper elastic portions 34 are provided on the short side portions 26a of the middle portion 26. The stopper elastic portions 34 can abut against the inner surface of the covering member 17, described below, when the inner attachment member 11 and the outer cylinder 12 are moved relatively close together. The stopper elastic portion 34 is circumferentially connected to the middle elastic body 32.

The stopper elastic portions 34 are axially connected to the end connectors 31b. The stopper elastic portions 34 and the elastic bodies 31, 32 are integrally formed of rubber material, for example. The outer circumferential surface of the inner attachment member 11 is entirely covered with a rubber material, for example.

Within the stopper elastic portion 34, the outer surface of an inner portion 34a, which includes the center and is located on the inside along the circumferential direction, is located radially inward from the outer surface of outer portions 34b, which are located on the outside and are connected to the middle elastic bodies 32. The outer diameter of the stopper elastic portion 34 may be equal over the entire circumference. The inner portion 34a and the outer portions 34b are circumferentially connected over the entire axial length. The outer surface of the inner portion 34a is formed in the shape of an arc centered on the central axis O. The outer surface of the outer portions 34b is formed in the shape of a curved surface protruding radially outward. The sizes, in the axial direction, of the outer portions 34b and the main portion 32a of the middle elastic body 32 are equivalent to each other, and the axial positions of the outer portions 34b and the main portion 32a are equivalent to each other.

The covering member 17 is arranged between the inner attachment member 11 and the outer cylinder 12, covers, from outside in the radial direction, the portion located between the middle elastic bodies 32 adjacent to each other in the circumferential direction between the pair of end elastic bodies 31, and defines the liquid chambers 14a, 14b between the inner attachment member 11 and the covering member 17.

The stopper elastic portion 34 is arranged between the middle elastic bodies 32 adjacent to each other in the circumferential direction and forms part of a dividing wall of the liquid chambers 14a, 14b. The covering member 17 is formed of a material harder than the material forming the elastic bodies 31, 32, such as a synthetic resin material. The covering member 17 is fitted between the pair of end elastic bodies 31.

A high viscosity liquid with a kinematic viscosity of 50 cSt or more and 1000 cSt or less at 40° C., preferably 500 cSt or more and 1000 cSt or less, is sealed in the liquid chambers 14a, 14b. The kinematic viscosity is measured by a B-type viscometer (manufactured by TOKIMEC Co., Ltd.) in accordance with JIS K2283. Examples of the liquid include silicone oil.

One of the two axial ends of the covering member 17, and the rigid plate 33 provided on the end elastic body 31, are axially sandwiched and fixed by a fixing portion 23 formed at one of the axial ends of the outer cylinder 12. In the present embodiment, a fixing flange 17c protruding radially outward and extending circumferentially is formed at one of the ends of the covering member 17, and the fixing flange 17c and the rigid plate 33 are axially sandwiched and fixed by the fixing portion 23. The fixing flange 17c and the outer end of the rigid plate 33 in the radial direction are stacked in the axial direction with a rubber membrane therebetween. The fixing flange 17c need not be formed on the covering member 17.

The fixing portion 23 has a circumferential groove that is recessed radially outward and extends continuously over the entire circumferential length. The fixing flange 17c and the rigid plate 33, together with the end flange portion 31a, are fitted into this circumferential groove over the entire circumferential length. The fixing portion 23 is formed by bending one of the ends of the outer cylinder 12 and bulges radially outward.

A support protrusion 24 is formed at the other axial end of the outer cylinder 12, protrudes radially inward, and axially supports the other axial end of the covering member 17. The support protrusion 24 is formed by bending the other end of the outer cylinder 12 into a flange shape. The support protrusion 24 axially supports the other end of the covering member 17 via the rigid plate 33. The support protrusion 24 need not be formed on the outer cylinder 12.

The covering member 17 surrounds the inner attachment member 11 from the outside in the radial direction over the entire circumference.

The inner surface of the covering member 17 is in liquid-tight contact with the outer surface of the middle elastic bodies 32 and is not in contact with the stopper elastic portions 34. The covering member 17 compressively deforms the middle elastic bodies 32 in the other direction Y. Along the inner surface of the covering member 17, the portion located between the middle elastic bodies 32 adjacent to each other in the circumferential direction and that defines the liquid chambers 14a, 14b is formed in the shape of an arc centered on the central axis O in a cross-sectional view orthogonal to the central axis O. A stopper part 17b is formed on a portion of the inner surface of the covering member 17 that defines the liquid chambers 14a, 14b, protrudes radially inward, and can abut against the outer surface of the inner portion 34a of the stopper elastic portion 34 when the inner attachment member 11 and the outer cylinder 12 are moved relatively close together.

Figure 6:
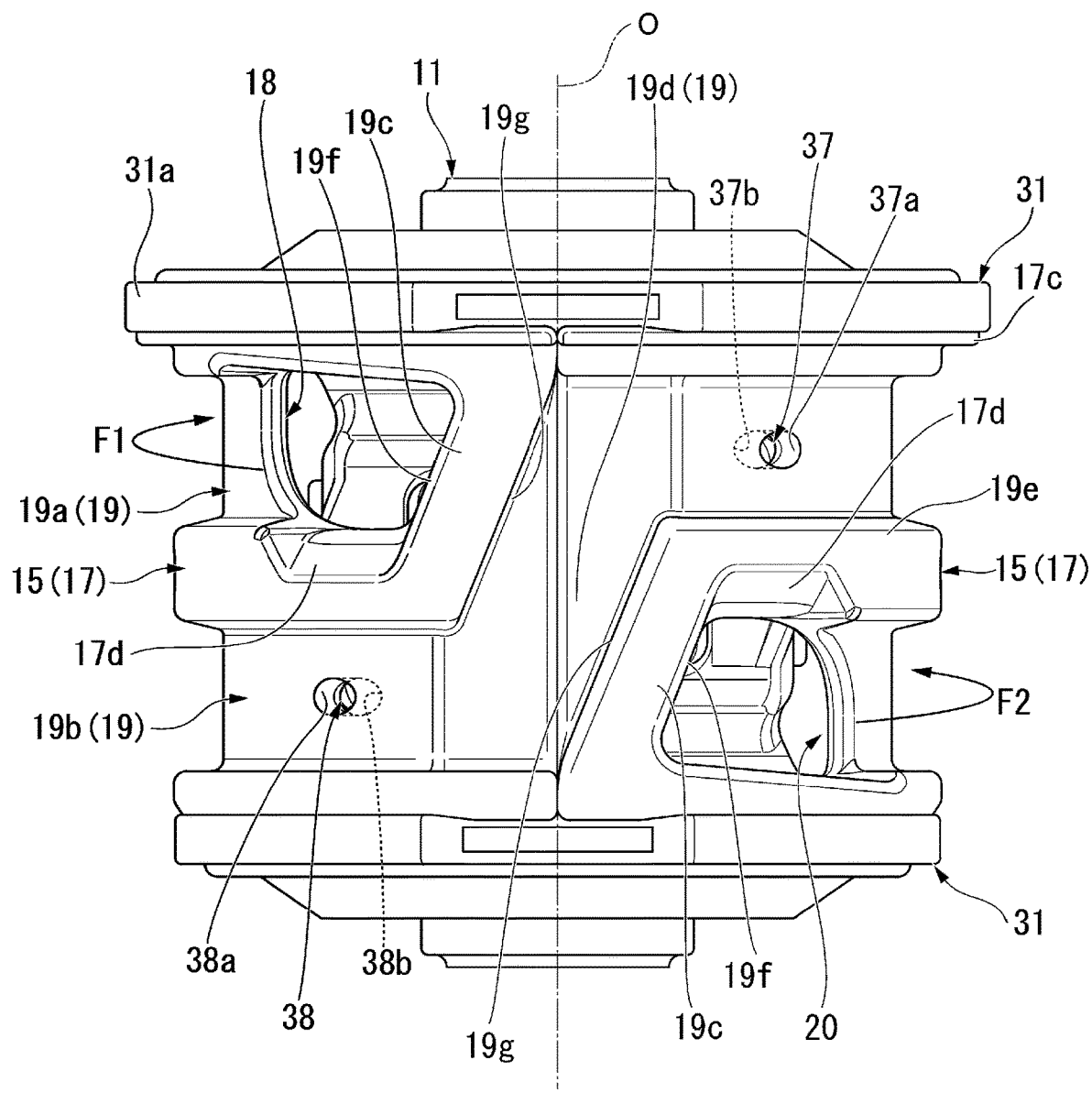
FIG. 6 is a view along arrow VI in the anti-vibration device illustrated in FIG. 1 with the outer cylinder removed.

As illustrated in FIG. 6, the outer circumferential surface of the covering member 17 has formed thereon a body groove 19 that defines an orifice passage between the covering member 17 and the inner circumferential surface of the outer cylinder 12, a first connecting aperture 18 that opens into the liquid chamber 14a, which is one of the liquid chambers 14a, 14b, and into the body groove 19, and a second connecting aperture 20 that opens into the other liquid chamber 14b, which is one of the liquid chambers 14a, 14b, and into the body groove 19. Since the orifice passage is defined by the body groove 19, it may be described as the orifice passage 19.

The first connecting aperture 18 and the second connecting aperture 20 are arranged at different axial positions and are adjacent to each other in the circumferential direction. The first connecting aperture 18 and the second connecting aperture 20 each separately open into the body groove 19 at both ends in the direction in which the body groove 19 extends. The first connecting aperture 18 and the second connecting aperture 20 are arranged to be adjacent to each other in the axial direction.

Figure 8:
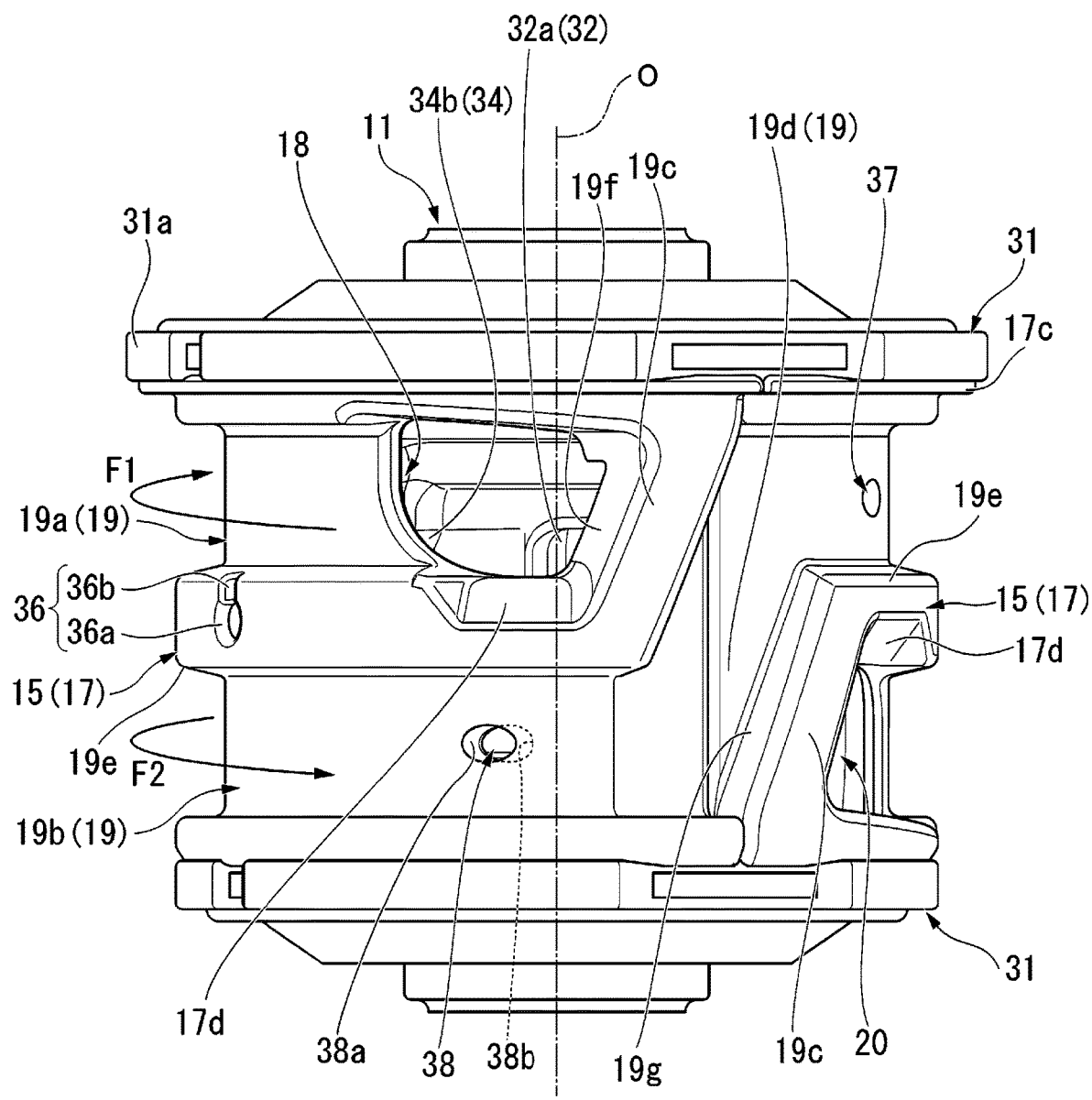
FIG. 8 is a front view of a first connecting aperture along arrow VIII in the anti-vibration device illustrated in FIG. 1 with the outer cylinder removed.
Figure 9:
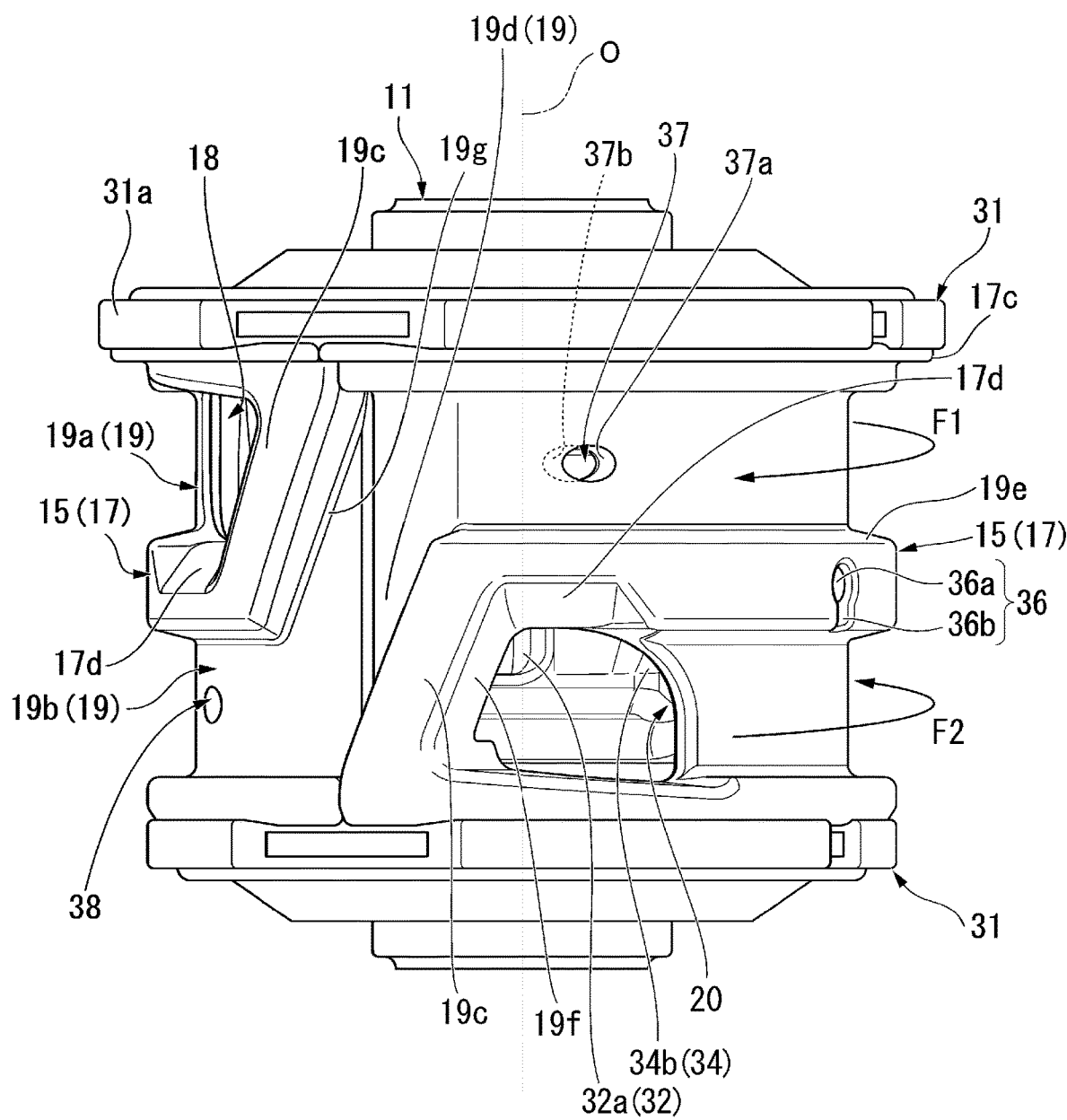
FIG. 9 is a front view of a second connecting aperture along arrow IX in the anti-vibration device illustrated in FIG. 1 with the outer cylinder removed.

As illustrated in FIGS. 8 and 9, the first connecting aperture 18 and the second connecting aperture 20 are diametrically opposite a portion of the stopper elastic portion 34. In the illustrated example, the first connecting aperture 18 and the second connecting aperture 20 are diametrically opposite the axial end of one of the two outer portions 34b of the stopper elastic portion 34. As illustrated in FIG. 10, the outer circumferential surface of the axial end of the outer portion 34b is recessed radially inward. In the illustrated example, the outer circumferential surface of the axial end of the outer portion 34b extends radially inward as it moves towards the outside in the axial direction.

A configuration may be adopted in which, of the plurality of outer portions 34b, only the end of the outer portion 34b in the axial direction diametrically opposite to the first connecting aperture 18, into which the below-described injection hole 12a opens, is recessed radially inward. The outer circumferential surface of each portion of the stopper elastic portion 34 that is diametrically opposed to the first connecting aperture 18 and the second connecting aperture 20 need not be depressed radially inward.

Figure 7:
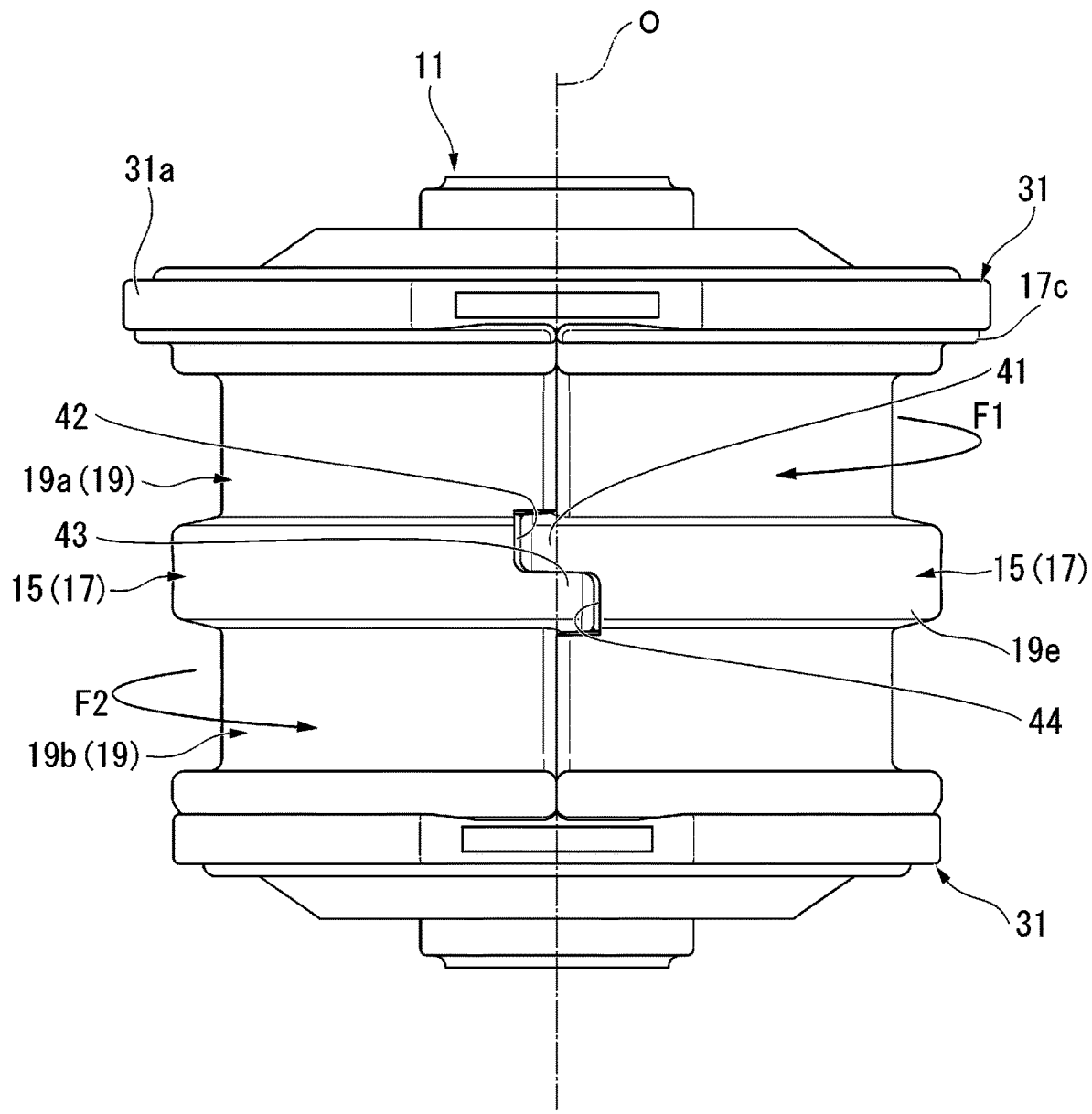
FIG. 7 is a view along arrow VII in the anti-vibration device illustrated in FIG. 1 with the outer cylinder removed.

As illustrated in FIGS. 6 and 7, the body groove 19 includes a first groove 19a and a second groove 19b, which extend circumferentially and are arranged at different axial positions from each other, and a third groove 19d that connects the first groove 19a and the second groove 19b.

The circumferential lengths of the first groove 19a and the second groove 19b are the same and are greater than the length of the third groove 19d. The first connecting aperture 18 opens at one circumferential end of the first groove 19a, the second connecting aperture 20 opens at one circumferential end of the second groove 19b, and the third groove 19d connects the other respective circumferential ends of the first groove 19a and the second groove 19b. The other circumferential ends of the first groove 19a and the second groove 19b are circumferentially adjacent to each other. The third groove 19d is provided between the circumferentially adjacent first connecting aperture 18 and second connecting aperture 20.

A second chamfered portion (chamfered portion) 17d is formed on at least a portion of the aperture circumferential edge of at least one of the first connecting aperture 18 and the second connecting aperture 20 on the outer circumferential surface of the covering member 17. The second chamfered portion 17d need not be formed on the outer circumferential surface of the covering member 17.

The second chamfered portion 17d is formed on the aperture circumferential edge of both the first connecting aperture 18 and the second connecting aperture 20. The second chamfered portion 17d extends in a direction to widen the respective apertures of the first connecting aperture 18 and the second connecting aperture 20 as it moves radially outward. The second chamfered portion 17d is formed on a partition 19e, of the wall portion defining the body groove 19, that extends circumferentially and partitions the first groove 19a and the second groove 19b in the axial direction.

Within the wall portion defining the body groove 19, end walls 19c are provided separately at the ends in the direction in which the body groove 19 extends, extend axially, and separately define a portion of the inner surface of the first connecting aperture 18 and the second connecting aperture 20. The circumferential size of the end walls 19c is equal over the entire length thereof in the axial direction. The end walls 19c extend in a straight line in a direction inclined in both the axial direction and the circumferential direction. The end walls 19c may be modified as needed by, for example, adopting a configuration that extends straight in the axial direction or a configuration that varies in circumferential size from one side to the other side in the axial direction.

The end wall 19c defining a portion of the inner surface of the first connecting aperture 18 extends toward the opposite side of the first connecting aperture 18 along the circumferential direction as it moves away from the second groove 19b along the axial direction. The end wall 19c defining a portion of the inner surface of the second connecting aperture 20 extends toward the opposite side of the second connecting aperture 20 along the circumferential direction as it moves away from the first groove 19a along the axial direction. The end wall 19c defining a portion of the inner surface of the first connecting aperture 18 and the end wall 19c defining a portion of the inner surface of the second connecting aperture 20 extend approximately parallel to each other. The portion circumferentially sandwiched by these end walls 19c is the third groove 19d. That is, of circumferential end faces 19f, 19g in the end walls 19c, one inner end face 19f defines a portion of the inner surface of the first connecting aperture 18 or the second connecting aperture 20, and the outer end face 19g opposite the inner end face 19f defines the third groove 19d.

The covering member 17 includes a plurality of dividers 15 divided in the circumferential direction, and circumferential edges 15a of dividers 15 adjacent to each other in the circumferential direction abut against each other to form an overall cylindrical shape. Two dividers 15 are formed to have an equivalent shape and size and are arranged to be inverted in the axial direction while the circumferential edges 15a are connected in the circumferential direction. A configuration entirely formed integrally into a cylindrical shape may be adopted as the covering member 17.

The covering member 17 covers the middle elastic body 32 over the entire circumference. The circumferential edges 15a of the dividers 15 are located in the circumferential center of the middle elastic body 32. The first connecting aperture 18 and the second connecting aperture 20 are each separately formed at circumferential ends adjacent to each other in the circumferential direction in each of the two dividers 15.

As illustrated in FIGS. 1 and 7, a first engaging portion 41 and a second engaging portion 42, separately formed on the circumferential edge 15a of each of the dividers 15 abutted against each other, engage with each other to regulate the axial and radial relative movement of the dividers 15 that are adjacent to each other in the circumferential direction. The first engaging portion 41 and second engaging portion 42 need not be formed on each of the dividers 15.

The first engaging portion 41 and the second engaging portion 42 are formed on a portion of the circumferential edges 15a of the dividers 15 located between the first groove 19a and the second groove 19b. A portion of each of first engaging portion 41 and the second engaging portion 42 is formed in the partition 19e. The first engaging portion 41 and the second engaging portion 42 are provided on opposite sides of the third groove 19d that sandwiches the inner attachment member 11 in the radial direction.

The first engaging portion 41 is a convex portion protruding circumferentially from the circumferential edge 15a of one divider 15. The second engaging portion 42 is a circumferentially recessed concave portion formed on the circumferential edge 15a of the other divider 15. The second engaging portion 42 does not open into the radially inward-facing inner surface of the covering member 17, but rather into the outer circumferential surface of the partition 19e. The first engaging portion 41 is fitted within the second engaging portion 42.

A third engaging portion 43 and a fourth engaging portion 44, separately formed on the circumferential edge 15a of each of the dividers 15 abutted against each other, engage with each other to regulate the axial and radial relative movement of the dividers 15 that are adjacent to each other in the circumferential direction. The third engaging portion 43 and fourth engaging portion 44 need not be formed on each of the dividers 15.

The third engaging portion 43 is connected in the axial direction to the second engaging portion 42 and is a convex portion protruding circumferentially from the circumferential edge 15a of the other divider 15. The fourth engaging portion 44 is connected in the axial direction to the first engaging portion 41 and is a circumferentially recessed concave portion formed on the circumferential edge 15a of one divider 15. The fourth engaging portion 44 does not open into the inner surface of the covering member 17, but rather into the outer circumferential surface of the partition 19e. The third engaging portion 43 is fitted within the fourth engaging portion 44. The third engaging portion 43 and the first engaging portion 41 are stacked in the axial direction.

Figure 4:
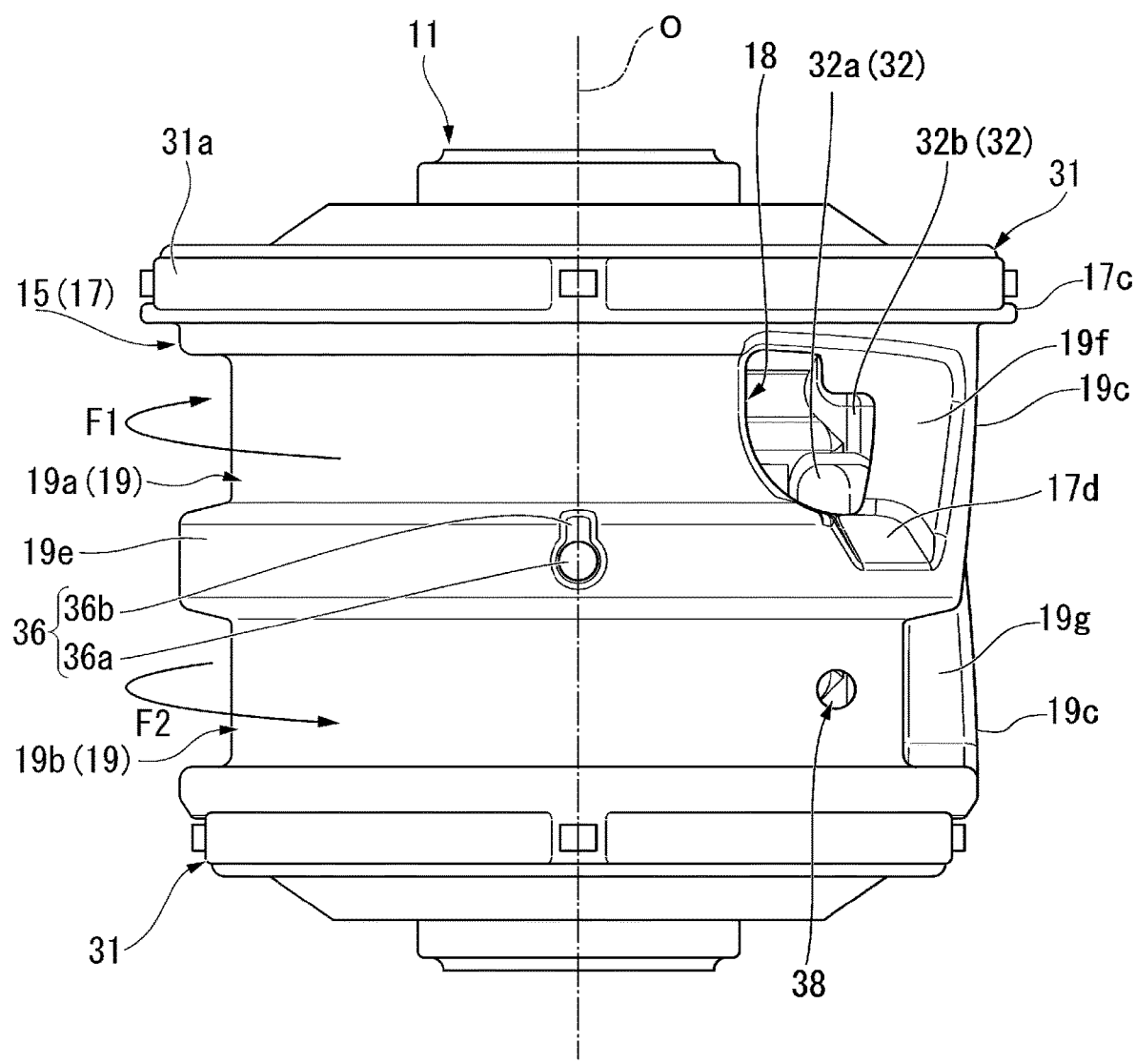
FIG. 4 is a view along arrow IV in the anti-vibration device illustrated in FIG. 1 with an outer cylinder removed.
Figure 5:
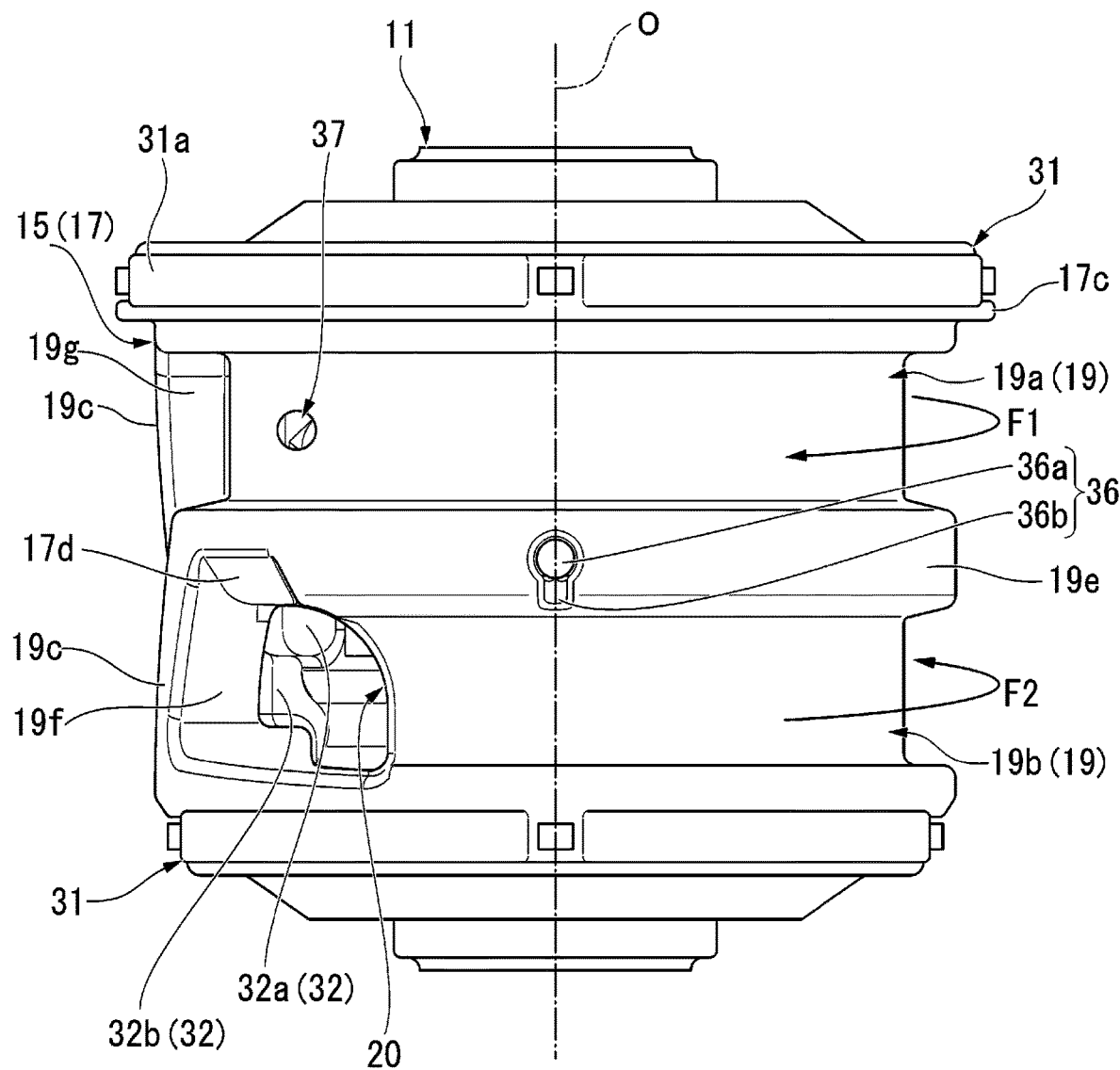
FIG. 5 is a view along arrow V in the anti-vibration device illustrated in FIG. 1 with the outer cylinder removed.

As illustrated in FIGS. 4 and 5, the covering member 17 is formed by injection molding and has an injection gate mark 36 in the partition 19e. The injection gate mark 36 is formed by a liquid reservoir recess 36a and a connection groove 36b extending in the axial direction from the liquid reservoir recess 36a and connecting to one of the first groove 19a and the second groove 19b.

The injection gate mark 36 is provided at a portion of the partition 19e that is closer to one of the first connecting aperture 18 and the second connecting aperture 20 than to the other. The injection gate mark 36 may be provided at a portion of the partition 19e that is an equal distance away from both the first connecting aperture 18 and the second connecting aperture 20.

The injection gate mark 36 is connected to the first groove 19a or the second groove 19b into which one of the first connecting aperture 18 and the second connecting aperture 20 opens. The injection gate mark 36 may be connected to the first groove 19a or the second groove 19b into which the other of the first connecting aperture 18 and the second connecting aperture 20 opens.

In the illustrated example, two injection gate marks 36 are provided in the partition 19e, one injection gate mark 36 is provided closer to the first connecting aperture 18 than to the second connecting aperture 20 and is connected to the first groove 19a, and the other injection gate mark 36 is provided closer to the second connecting aperture 20 than to the first connecting aperture 18 and is connected to the second groove 19b. One injection gate mark 36 is provided in each divider 15.

The outer cylinder 12 is elastically connected to the inner attachment member 11 by being externally fitted to the covering member 17, and an orifice passage connecting the liquid chambers 14a, 14b is defined between the body groove 19 and the inner circumferential surface of the outer cylinder 12. The orifice passage connects the liquid chambers 14a, 14b through the first connecting aperture 18 and the second connecting aperture 20.

The orifice passage extends between the covering member 17 and the outer cylinder 12 over more than one and a half revolutions in the circumferential direction. In the illustrated example, the orifice passage extends between the covering member 17 and the outer cylinder 12 over nearly two revolutions in the circumferential direction.

When vibration is inputted to the anti-vibration device 1, the elastic bodies 31, 32 are elastically deformed while the internal volume of the liquid chambers 14a, 14b fluctuates, causing the liquid in the liquid chambers 14a, 14b to circulate through the orifice passage and generate liquid column resonance, which dampens and absorbs vibration.

Figure 3:
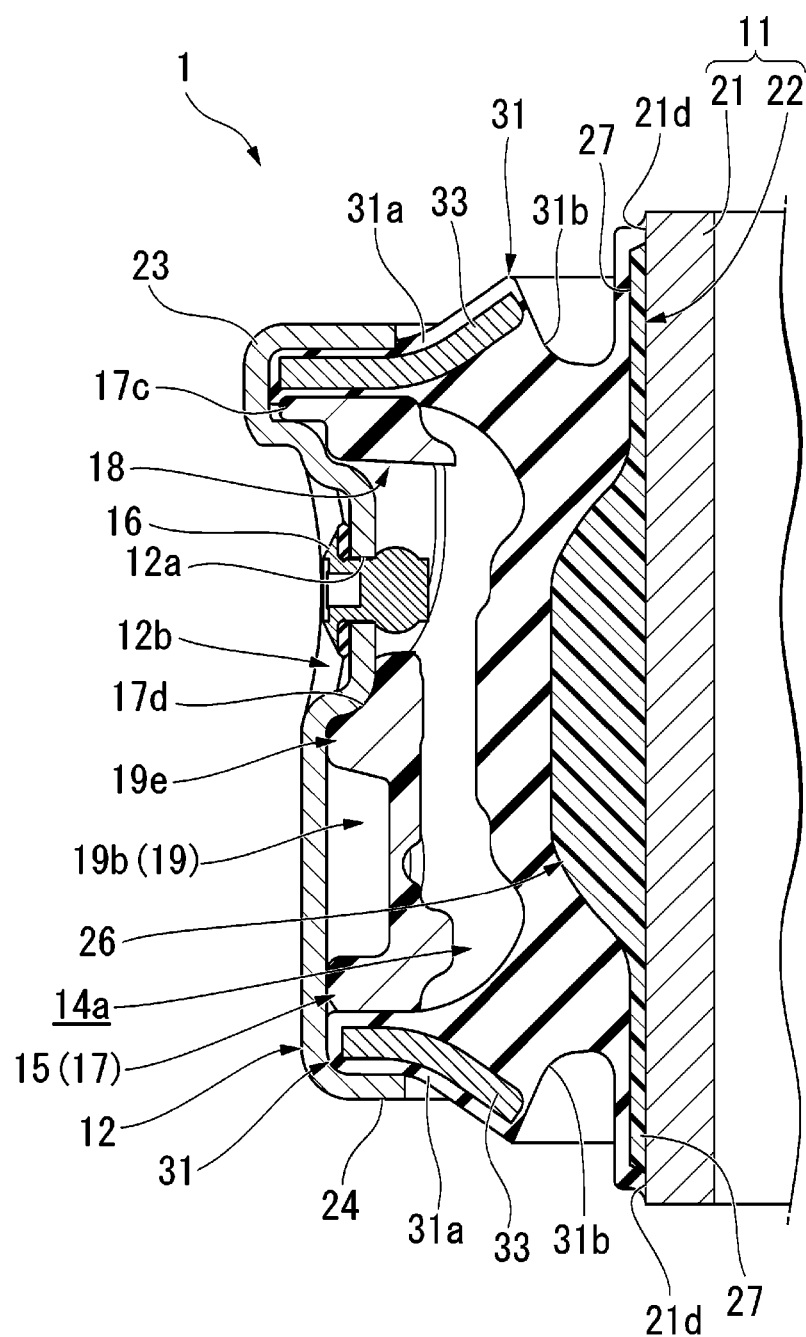
FIG. 3 is a cross-sectional view along arrows III-III of the anti-vibration device illustrated in FIG. 1.

As illustrated in FIG. 3, a concave portion 12b that is recessed inward in the radial direction is provided on the outer circumferential surface of the outer cylinder 12. The concave portion 12b need not be provided on the outer circumferential surface of the outer cylinder 12. The portion of the inner circumferential surface of the outer cylinder 12 that corresponds to the bottom wall of the concave portion 12b (the portion that serves as the bottom wall) expands inward in the radial direction. The concave portion 12b is inserted inside the second chamfered portion 17d in the partition 19e.

An injection hole 12a is formed in the bottom wall of the concave portion 12b for injecting liquid into liquid chambers 14a, 14b. The injection hole 12a opens toward at least one of the first connecting aperture 18 and the second connecting aperture 20. In the illustrated example, the injection hole 12a opens toward the first connecting aperture 18. A sealing material 16 is fitted into the injection hole 12a, and the injection hole 12a is sealed by the sealing material 16. In the illustrated example, the sealing material 16 is a rivet, and the head of the rivet is located farther inward radially than the outer circumferential surface of the outer cylinder 12. The sealing material 16 is inserted into the first connecting aperture 18. An injection hole 12a opening to the second connecting aperture 20 may be formed in the outer cylinder 12.

As illustrated in FIG. 6, in the wall surface defining the orifice passage, a first bypass through hole 37 is formed for liquid circulating in the orifice passage from one liquid chamber 14a toward the other liquid chamber 14b to bypass the orifice passage and reach the other liquid chamber 14b, and a second bypass through hole 38 is formed for liquid circulating in the orifice passage from the other liquid chamber 14b toward the one liquid chamber 14a to bypass the orifice passage and reach the one liquid chamber 14a.

The distribution resistance of the liquid passing through the first bypass through hole 37 and the second bypass through hole 38 is smaller than the distribution resistance of the orifice passage. The cross-sectional area of each of the first bypass through hole 37 and the second bypass through hole 38 is, for example, approximately 3 mm² and is smaller than the cross-sectional area of the orifice passage. The length of each of the first bypass through hole 37 and the second bypass through hole 38 is less than the length of the orifice passage.

The first bypass through hole 37 and the second bypass through hole 38 are formed on the outer circumferential surface of the covering member 17 and on the groove bottom surface of the body groove 19. The first bypass through hole 37 and the second bypass through hole 38 are formed separately in each of the two dividers 15.

The first bypass through hole 37 opens to the other end of the first groove 19a in the circumferential direction. The circumferential positions of the first bypass through hole 37 and the second connecting aperture 20 are equivalent to each other. The second bypass through hole 38 opens to the other end of the second groove 19b in the circumferential direction. The circumferential positions of the second bypass through hole 38 and the first connecting aperture 18 are equivalent to each other. The first bypass through hole 37 opens to the other liquid chamber 14b at the front end in a distribution direction F1 in which the liquid is distributed in the orifice passage from one liquid chamber 14a to the other liquid chamber 14b. The second bypass through hole 38 opens to one liquid chamber 14a at the front end in a distribution direction F2 in which the liquid is distributed in the orifice passage from the other liquid chamber 14b to one liquid chamber 14a.

The first bypass through hole 37 is located at a position that is more than 180° away, about the central axis O, from the first connecting aperture 18 in the distribution direction F1, and the second bypass through hole 38 is located at a position that is more than 180° away, about the central axis O, from the second connecting aperture 20 in the distribution direction F2.

The first bypass through hole 37 is located at the axial center of the first groove 19a, and the second bypass through hole 38 is located at the axial center of the second groove 19b. The openings in the groove bottom surface of the body groove 19 in each of the first bypass through hole 37 and the second bypass through hole 38 are elliptical in shape and elongated in the circumferential direction.

Within the inner circumferential surface of the first bypass through hole 37, a rear end face 37a is located at the rear end in the distribution direction F1 in which the liquid is distributed from one liquid chamber 14a to the other liquid chamber 14b in the orifice passage, faces the front in the distribution direction F1, and extends towards the front in the distribution direction F1 as it moves from the outside to the inside in the radial direction. In the illustrated example, within the inner circumferential surface of the first bypass through hole 37, a front end face 37b is also located at the front end in the distribution direction F1, faces the rear in the distribution direction F1, and extends towards the front in the distribution direction F1 as it moves from the outside to the inside in the radial direction. The rear end face 37a and the front end face 37b in the first bypass through hole 37 are nearly parallel.

Within the inner circumferential surface of the second bypass through hole 38, a rear end face 38a is located at the rear end in the distribution direction F2 in which the liquid is distributed from the other liquid chamber 14b to one liquid chamber 14a in the orifice passage, faces the front in the distribution direction F2, and extends towards the front in the distribution direction F2 as it moves from the outside to the inside in the radial direction. In the illustrated example, within the inner circumferential surface of the second bypass through hole 38, a front end face 38b is also located at the front end in the distribution direction F2, faces the rear in the distribution direction F2, and extends towards the front in the distribution direction F2 as it moves from the outside to the inside in the radial direction. The rear end face 38a and the front end face 38b in the second bypass through hole 38 are nearly parallel.

As illustrated in FIGS. 2, 10, and 11, the middle elastic body 32 has formed therein groove-shaped leak passages 28, 29 that are elastically deformed by the internal pressure of the liquid chambers 14a, 14b to connect the liquid chambers 14a, 14b and allow liquid to circulate between the liquid chambers 14a, 14b. When the leak passages 28, 29 are in a standby state before the internal pressure of the liquid chambers 14a, 14b fluctuates, the communication between the liquid chambers 14a, 14b through the leak passages 28, 29 is blocked by the covering member 17 elastically deforming the dividing walls of the leak passages 28, 29.

The leak passages 28, 29 are formed on the outer surface of the middle elastic body 32 in contact with the inner surface of the covering member 17. The leak passages 28, 29 open to the side surface, which faces the circumferential direction, of the middle elastic body 32. The leak passages 28, 29 extend in a straight line in a direction orthogonal to the axial direction in a front view, from outside in the radial direction, of the outer surface of the middle elastic body 32.

A plurality of leak passages 28, 29 are formed in the middle elastic body 32 at different positions in the axial direction. In the illustrated example, one each of the leak passages 28, 29 are formed in the main portion 32a and the pair of secondary portions 32b in the middle elastic body 32.

Among the plurality of leak passages 28, 29, a first leak passage 28 formed in the main portion 32a is arranged in the central portion of the main portion 32a in the axial direction, and the central portion, in the axial direction, of a second leak passage 29 formed in the secondary portion 32b is located farther outward in the axial direction than the central portion, in the axial direction, of the secondary portion 32b. At least two of the plurality of leak passages 28, 29 have different flow path lengths. In the illustrated example, the circumferential length of the first leak passage 28 is greater than the circumferential length of the second leak passage 29. The width of the first leak passage 28 is less than the width of the second leak passage 29.

For at least two of the plurality of leak passages 28, 29, the amount of elastic deformation of the dividing walls of the leak passages 28, 29 by the covering member 17 differs. In the present embodiment, the amount of elastic deformation, by the covering member 17, of the dividing wall of the first leak passage 28 is greater than the amount of elastic deformation, by the covering member 17, of the dividing wall of the second leak passage 29. The internal pressure of the liquid chamber 14a, 14b to which the first leak passage 28 opens is higher than the internal pressure of the liquid chamber 14a, 14b to which the second leak passage 29 opens.

The amount of elastic deformation, by the covering member 17, of the dividing wall of the first leak passage 28 may be equal to or less than the amount of elastic deformation, by the covering member 17, of the dividing wall of the second leak passage 29. The internal pressure of the liquid chamber 14a, 14b to which the first leak passage 28 opens may be equal to or less than the internal pressure of the liquid chamber 14a, 14b to which the second leak passage 29 opens.

Projecting ribs 17a are formed on the inner surface of the covering member 17 and are inserted separately into the first leak passage 28 and the second leak passage 29. A plurality of the projecting ribs 17a are formed on the inner surface of the covering member 17 at intervals in the axial direction at locations on either side of the central axis O in the radial direction, and the projecting ribs 17a are separately inserted into the first leak passage 28 and the second leak passage 29. The projecting ribs 17a are disposed over the entire circumferential length of the first leak passage 28 and the second leak passage 29. The projecting ribs 17a abut against the entire inner surface of each of the first leak passage 28 and the second leak passage 29.

The projecting ribs 17a are formed at both ends in the circumferential direction on the inner surface of the divider 15. The projecting ribs 17a are divided circumferentially at the circumferential edge 15a of the divider 15 and are configured by two dividers 15 being assembled in the circumferential direction.

The first bypass through hole 37 and the second bypass through hole 38 are located farther outward in the axial direction than the first leak passage 28 and farther inward in the axial direction than the second leak passage 29.

As described above, according to the anti-vibration device 1 of the present embodiment, the injection hole 12a formed in the outer cylinder 12 and sealed by the sealing material 16 opens toward at least one of the first connecting aperture 18 and the second connecting aperture 20. Therefore, even if the sealing material 16 protrudes radially inward from the inner circumferential surface of the outer cylinder 12 through the injection hole 12a, or the aperture circumferential edge of the injection hole 12a in the outer cylinder 12 is deformed and protrudes radially inward, for example, the sealing material 16 or the like can enter at least one of the first connecting aperture 18 and second connecting aperture 20 and be prevented from abutting against a member provided inside the outer cylinder 12.

The stopper elastic portions 34 are provided to protrude toward the liquid chambers 14a, 14b on the outer circumferential surface of the inner attachment member 11, and therefore, when vibration with a large amplitude is input, the stopper elastic portions 34 are made to collide with the outer cylinder 12 via the covering member 17, thereby preventing further relative displacement of the inner attachment member 11 and the outer cylinder 12.

The outer circumferential surface of a portion of the stopper elastic portions 34 that is opposite at least one of the first connecting aperture 18 and the second connecting aperture 20 is recessed inward in the radial direction. Therefore, even if the sealing material 16 or the like passes through the injection hole 12a and at least one of the first connecting aperture 18 and the second connecting aperture 20 to enter into the fluid chambers 14a, 14b, the sealing material 16 or the like can be prevented from abutting against the stopper elastic portions 34.

On the outer circumferential surface of the covering member 17, the second chamfered portion 17d is formed on at least a portion of the aperture circumferential edge of at least one of the first connecting aperture 18 and the second connecting aperture 20, and therefore, the sealing material 16 or the like protruding from the inner circumferential surface of the outer cylinder 12 inward in the radial direction can be prevented from interfering with the outer circumferential surface of the covering member 17.

Within the wall portion defining the body groove 19, end walls 19c are provided separately at the ends in the direction in which the body groove 19 extends, extend axially, and separately define a portion of the inner surface of the first connecting aperture 18 and the second connecting aperture 20. The circumferential size of the end walls 19c is equal over the entire length thereof in the axial direction. Therefore, compared to a configuration in which, for example, of the circumferential end faces 19f, 19g of the end walls 19c, the inner end face 19f defining a portion of the inner surface of the first connecting aperture 18 or the second connecting aperture 20 extends away from the outer end face 19g opposite the inner end face 19f as it moves from one side to the other in the axial direction, it is possible to widen the first connecting aperture 18 and the second connecting aperture 20 in the circumferential direction as they move from one side to the other in the axial direction, and to secure a large opening area of the first connecting aperture 18 and the second connecting aperture 20.

Since a high viscosity liquid is sealed in the liquid chambers 14a, 14b, it is possible to generate peaks in damping characteristics based on liquid column resonance in the orifice passage over a wide frequency range, thus achieving damping performance over a wide frequency range.

The technical scope of the present disclosure is not limited to the aforementioned embodiments, and various changes can be made without departing from the scope defined in the claims of the present disclosure.

For example, the rigid plate 33 need not be provided in the end elastic body 31, and the fixing portion 23 need not be provided in the outer cylinder 12.

A configuration entirely formed integrally may be adopted as the inner attachment member 11.

The outer diameter of the inner attachment member 11 may be equal over the entire length in the axial direction.

As the injection gate mark 36, for example, a configuration without the liquid reservoir recess 36a or the connection groove 36b, or a configuration provided in a portion other than the partition 19e in the covering member 17, may be adopted.

The first bypass through hole 37 and the second bypass through hole 38 need not be formed in the covering member 17. The positions at which the first bypass through hole 37 and the second bypass through hole 38 are formed in the body groove 19 are not limited to the above embodiment and may be changed as needed. The respective inner circumferential surfaces of the first bypass through hole 37 and the second bypass through hole 38 may be modified as needed by, for example, being extended in the radial direction.

As the orifice passage, a configuration extending over one revolution or less in the circumferential direction may be adopted.

Although a configuration in which the body groove 19 is formed on the outer circumferential surface of the covering member 17 has been illustrated, the body groove 19 may be formed on the inner circumferential surface of the outer cylinder 12.

The liquid to be sealed in the liquid chambers 14a, 14b is not limited to the above embodiment and may be water and ethylene glycol, for example.

A reinforcement may be embedded in the middle elastic bodies 32, the middle elastic bodies 32 need not be compressed and deformed by the covering member 17, the covering member 17 may be fitted between middle elastic bodies 32 adjacent to each other in the circumferential direction, and the middle elastic bodies 32 may be exposed from between covering members 17 adjacent to each other in the circumferential direction.

The plurality of leak passages 28, 29 need not be formed in the middle elastic bodies 32.

Although a configuration in which the main portion 32a and secondary portions 32b are provided as the middle elastic body 32 has been illustrated, modifications may be made as necessary, such as adopting a configuration with only one of the main portion 32a and secondary portion 32b.

Other components in the aforementioned embodiments may be replaced with well-known components without departing from the scope defined in the claims of the present disclosure, and the aforementioned embodiments and variations may be combined as appropriate.

In the anti-vibration device according to the first aspect, the injection hole formed in the outer cylinder and sealed by a sealing material opens toward at least one of the first connecting aperture and the second connecting aperture. Therefore, for example, even if the sealing material protrudes radially inward from the inner circumferential surface of the outer cylinder through the injection hole, or the aperture circumferential edge of the injection hole in the outer cylinder is deformed and protrudes radially inward, the sealing material or the like can enter at least one of the first connecting aperture and the second connecting aperture and be prevented from abutting against a member provided inside the outer cylinder.

An anti-vibration device according to a second aspect of the present disclosure has the configuration of the first aspect, wherein on an outer circumferential surface of the inner attachment member, stopper elastic portions are separately provided to protrude toward each liquid chamber in the pair of liquid chambers, and an outer circumferential surface of a portion of the stopper elastic portions that is opposite at least one of the first connecting aperture and the second connecting aperture is recessed inward in the radial direction.

In the anti-vibration device according to the second aspect of the present disclosure, stopper elastic portions are provided to protrude toward the pair of liquid chambers on the outer circumferential surface of the inner attachment member, and therefore, when vibration with a large amplitude is input, the stopper elastic portions are made to collide with the outer cylinder via the covering member, thereby preventing further relative displacement of the inner attachment member and the outer cylinder.

Furthermore, in the anti-vibration device according to the second aspect of the present disclosure, the outer circumferential surface of a portion of the stopper elastic portions that is opposite at least one of the first connecting aperture and the second connecting aperture is recessed inward in the radial direction, and therefore, even if the sealing material or the like passes through the injection hole and at least one of the first connecting aperture and the second connecting aperture to enter into one of the two fluid chambers, the sealing material or the like can be prevented from abutting against the stopper elastic portions.

The anti-vibration device according a third aspect of the present disclosure has the configuration of the first or second aspect, wherein on an outer circumferential surface of the covering member, a chamfered portion is formed on at least a portion of an aperture circumferential edge of at least one of the first connecting aperture and the second connecting aperture.

In the anti-vibration device according to the third aspect of the present disclosure, on the outer circumferential surface of the covering member, a chamfered portion is formed on at least a portion of the aperture circumferential edge of at least one of the first connecting aperture and the second connecting aperture, and therefore, a sealing material or the like protruding from the inner circumferential surface of the outer cylinder inward in the radial direction can be prevented from interfering with the outer circumferential surface of the covering member.

The anti-vibration device according a fourth aspect of the present disclosure has the configuration of any one of the first to third aspects, wherein a body groove defining the orifice passage between the covering member and an inner circumferential surface of the outer cylinder is formed on an outer circumferential surface of the covering member, the first connecting aperture and the second connecting aperture each separately open in the body groove at both ends in a direction in which the body groove extends, end walls, extending in the axial direction and provided separately at both ends in the direction in which the body groove extends within wall portions defining the body groove, separately define portions of an inner surface of each of the first connecting aperture and the second connecting aperture, and a circumferential size of the end walls is equal over an entire length thereof in the axial direction.

In the anti-vibration device according to the fourth aspect of the present disclosure, end walls, extending in the axial direction and provided separately at both ends in the direction in which the body groove extends within wall portions defining the body groove, separately define portions of an inner surface of each of the first connecting aperture and the second connecting aperture, and a circumferential size of the end walls is equal over an entire length thereof in the axial direction. Therefore, compared to a configuration in which, for example, of the circumferential end faces of the end walls, the inner end face defining a portion of the inner surface of the first connecting aperture or the second connecting aperture extends away from the outer end face opposite the inner end face as it moves from one side to the other in the axial direction, it is possible to widen the first connecting aperture and the second connecting aperture in the circumferential direction as they move from one side to the other in the axial direction, and to secure a large opening area of the first connecting aperture and the second connecting aperture.

INDUSTRIAL APPLICABILITY

According to the anti-vibration device of the present disclosure, the sealing material can be prevented from abutting against a member provided on the inside of the outer cylinder.

REFERENCE SIGNS LIST

1 Anti-vibration device
11 Inner attachment member
12 Outer cylinder
12a Injection hole
14a, 14b Liquid chamber
16 Sealing material
17 Covering member
17d Second chamfered portion (chamfered portion)
18 First connecting aperture
19 Main groove
19c End wall
20 Second connecting aperture
31 End elastic body (elastic body)
32 Middle elastic body (elastic body)
34 Stopper elastic portion
O Central axis

The invention claimed is:

1. An anti-vibration device comprising:
an inner attachment member to be connected to one of a vibration generating portion and a vibration receiving portion and an outer cylinder to be connected to the other of the vibration generating portion and the vibration receiving portion and surrounding the inner attachment member; and
an elastic body elastically connecting the inner attachment member and the outer cylinder, wherein
the elastic body comprises a pair of middle elastic bodies arranged separately on both sides of the inner attachment member in a radial direction intersecting a central axis of the outer cylinder in plan view from an axial direction along the central axis,
a covering member is arranged between the inner attachment member and the outer cylinder, covers, from outside in the radial direction, an area between the pair of middle elastic bodies adjacent to each other in a circumferential direction about the central axis in the plan view, and defines a pair of liquid chambers between the inner attachment member and the covering member,
an orifice passage connecting each liquid chamber in the pair of liquid chambers is formed between the covering member and the outer cylinder,
a first connecting aperture and a second connecting aperture that separately connect each liquid chamber in the pair of liquid chambers and the orifice passage are formed in the covering member, and
an injection hole for injecting liquid into the liquid chambers is formed in the outer cylinder to open toward at least one of the first connecting aperture and the second connecting aperture and sealed by a sealing material,
on an outer circumferential surface of the inner attachment member, stopper elastic portions are separately provided to protrude toward each liquid chamber in the pair of liquid chambers,
a body groove defining the orifice passage between the covering member and an inner circumferential surface of the outer cylinder is formed on an outer circumferential surface of the covering member,
the first connecting aperture and the second connecting aperture each separately open in the body groove at both ends in a direction in which the body groove extends,
end walls, extending in the axial direction and provided separately at both ends in the direction in which the body groove extends within wall portions defining the body groove, separately define portions of an inner surface of each of the first connecting aperture and the second connecting aperture,
a circumferential size of the end walls is equal over an entire length thereof in the axial direction,
the main groove includes a first groove and a second groove that extend in the circumferential direction and are arranged at different axial positions from each other, and a third groove that connects the first groove and the second groove, and
the third groove extends in a direction inclined with respect to the axial direction, and an inner end face and an outer end face in the circumferential direction of each of the two end walls extend inclined with respect to the axial direction.

2. The anti-vibration device according to claim 1, wherein an outer circumferential surface of a portion of the stopper elastic portions that is opposite at least one of the first connecting aperture and the second connecting aperture is recessed inward in the radial direction.

3. The anti-vibration device according to claim 1, wherein on an outer circumferential surface of the covering member, a chamfered portion is formed on at least a portion of an aperture circumferential edge of at least one of the first connecting aperture and the second connecting aperture.

* * * * *